United States Patent [19]

Salyer et al.

[11] Patent Number: 4,825,939

[45] Date of Patent: May 2, 1989

[54] POLYMERIC COMPOSITIONS INCORPORATING POLYETHYLENE GLYCOL AS A PHASE CHANGE MATERIAL

[75] Inventors: Ival O. Salyer, Dayton; Charles W. Griffen, Mason, both of Ohio

[73] Assignee: The University of Dayton, Dayton, Ohio

[21] Appl. No.: 886,755

[22] Filed: Jul. 15, 1986

Related U.S. Application Data

[62] Division of Ser. No. 646,395, Aug. 31, 1986, abandoned.

[51] Int. Cl.[4] .............................................. F28D 20/00
[52] U.S. Cl. ...................................... 165/53; 165/10; 252/70
[58] Field of Search ................. 165/10, 47, 53; 252/70

[56] References Cited

U.S. PATENT DOCUMENTS

| | | | |
|---|---|---|---|
| 3,220,917 | 11/1965 | Lowes | 524/377 |
| 3,354,108 | 11/1967 | Paradis et al. | 524/377 |
| 3,489,708 | 1/1970 | Isaksen et al. | 524/377 |
| 4,003,426 | 1/1977 | Best et al. | |
| 4,102,845 | 7/1978 | Schroder et al. | 524/377 |
| 4,111,189 | 9/1978 | Dizon | |
| 4,143,021 | 3/1979 | Garrett | 524/377 |
| 4,215,169 | 7/1980 | Wysong | 524/377 |
| 4,228,055 | 10/1980 | Wallace | 524/377 |
| 4,259,401 | 3/1981 | Chahroudi | |
| 4,341,649 | 7/1982 | Burns et al. | 252/70 |
| 4,384,661 | 5/1983 | Page et al. | 524/378 |
| 4,389,506 | 6/1983 | Hassall | 524/377 |
| 4,474,919 | 10/1984 | Lobos | 524/377 |
| 4,532,917 | 8/1985 | Taff et al. | 252/70 |
| 4,540,746 | 9/1985 | Roberts | 524/378 |

FOREIGN PATENT DOCUMENTS

| | | | |
|---|---|---|---|
| 0595737 | 4/1960 | Canada | 524/377 |
| 0662658 | 5/1963 | Canada | 524/377 |
| 0018591 | 11/1980 | European Pat. Off. | 524/377 |
| 0126312 | 11/1984 | European Pat. Off. | 524/377 |
| 1297341 | 6/1969 | Fed. Rep. of Germany | 524/377 |
| 0130635 | 10/1979 | Japan | 524/378 |
| 0559020 | 2/1944 | United Kingdom | 524/377 |
| 0781900 | 8/1957 | United Kingdom | 524/377 |
| 907016 | of 1962 | United Kingdom | 524/377 |
| 0939151 | 10/1963 | United Kingdom | 524/377 |
| 2050398 | 1/1981 | United Kingdom | 524/377 |

OTHER PUBLICATIONS

Vigo et al, "Temperature Adaptable Hollow Fibers Containing Polyethylene Glycols," Journal of Coated Fabrics, vol. 12 (Apr. 1983).

Primary Examiner—Albert W. Davis, Jr.
Attorney, Agent, or Firm—Biebel, French & Nauman

[57] ABSTRACT

A polymeric composition comprising a polymeric material and polyethylene glycol or end-capped polyethylene glycol as a phase change material, said polyethylene glycol and said end-capped polyethylene glycol having a molecular weight greater than about 400 and a heat of fusion greater than about 30 cal/g; the composition is useful in making molded and/or coated materials such as flooring, tiles, wall panels and the like; paints containing polyethylene glycols or end-capped polyethylene glycols are also disclosed.

15 Claims, 4 Drawing Sheets

POLYMERIC COMPOSITIONS INCORPORATING POLYETHYLENE GLYCOL AS A PHASE CHANGE MATERIAL

GOVERNMENT RIGHTS

The United States Government has certain rights under this invention as set forth in DOE Contract No. DE-AC03-82-CE30755.

This is a divisional of co-pending application Ser. No. 646,395, filed Aug. 31, 1986, now abandoned

BACKGROUND OF THE INVENTION

The present invention relates to polymeric compositions embodying phase change materials and, more particularly, to polymeric compositions incorporating polyethylene glycols and/or end-capped polyethylene glycols as phase change materials. These compositions are useful in the manufacture of materials such as flooring, tiles and the like as well as in forming pellets of the phase change materials useful in other applications. In accordance with one embodiment of the invention, polyethylene glycols and/or end-capped polyethylene glycols are incorporated into paint compositions.

There has been a great deal of interest in phase change thermal energy storage systems due to their inherent ability to store large amounts of heat and release it to the surrounding environment as temperatures drop below a predetermined level. These systems are of particular interest in the architectural and building trades where climate control and its concomitant energy consumption is one of the principal considerations in building design and material selection.

A variety of building materials and techniques have previously been used to conserve heat or cool and thereby reduce energy costs. Included among them are structural elements which incorporate phase change materials. By incorporating phase change materials into building materials, energy in excess of that necessary to maintain comfort conditions is inherently absorbed and subsequently released when the surrounding environment drops below the comfort range. Thus, in winter months, phase change materials incorporated into structural elements in the walls or floors of buildings and the like can absorb solar energy during daytime hours and release it to the interior at night as temperatures drop. In summer months, the same phase change material, due to its thermostatic character, conserves coolness by absorbing energy.

Structural elements and compositions incorporating phase change materials are more desirable than elements which only store sensible heat because they have a higher capacity to store energy and they absorb and release a large quantum of energy over a very narrow temperature range. A phase change material utilizes its latent heat of fusion for thermal storage. The latent heat of fusion is substantially greater than the sensible heat capacity of the material. That is, the amount of energy a material absorbs upon melting, or releases upon freezing, is much greater than the amount of energy it absorbs or releases upon increasing or decreasing in temperature 1° C. Thus, upon melting and freezing, per unit weight, a phase change material absorbs and releases substantially more energy than a material which stores purely sensible heat. Furthermore, as contrasted with a sensible heat storage material which absorbs and releases energy essentially uniformly over a broad temperature range, a phase change material absorbs and releases a large quantum of energy in the vicinity of its melting/freezing point. This is particularly advantageous in buildings where space is at a premium and energy storage and release are required within a very narrow comfort range.

Among the teachings which were available in the art prior to the present invention are those of U.S. Pat. No. 4,259,401 to Chahroudi et al which discloses both structural and non-structural building materials incorporating phase change materials. These building materials are made up of a rigid porous matrix structure which is impregnated with the phase change material. Three classes of phase change materials are disclosed, namely, hydrated salts, waxes, and clathrates. Cements, plasters or thermosetting materials may form the rigid matrix.

U.S. Pat. No. 4,111,189 to Dizon discloses a combined solar collector and thermal energy storage device in which the collector employs phase change matrix comprising a phase change material dispersed in a polymeric matrix. The preferred phase change material is polyethylene glycol having a molecular weight in the range of 4500 to 20,000.

SUMMARY OF THE INVENTION

The present invention is directed to polymeric compositions which are useful in thermal energy storage and include polyethylene glycol and/or an end-capped polyethylene glycol as a phase change material.

It has been found that polyethylene glycols and end-capped polyethylene glycols have relatively high heats of fusion (typically greater than 30 cal/gm) and melt at temperatures which make them useful as phase change materials for climate control, deicing, or in active solar energy storage systems. More particularly, it has been found that polyethylene glycols and/or end-capped polyethylene glycols can be dispersed in polymeric compositions and used to form molded or coated products in which the glycols maintain their melting points and heats of fusion and function effectively in passive thermal energy storage. Thus, by incorporating polyethylene glycols or end-capped glycols into polymeric compositions and using them to form flooring, paints, tiles and similar materials, heating and cooling costs can be reduced.

It has additionally been found that polyethylene glycols and end-capped polyethylene glycols can be incorporated into various polymeric materials and used to form pellets useful in active thermal energy storage systems such as a pellet bed heat exchangers as well as in solar passive storage systems.

Accordingly, a principal object of the present invention is to provide a polymeric composition which incorporates a polyethylene glycol or an end-capped polyethylene glycol as a phase change material.

A further object of the present invention is to provide a polymeric composition which incorporates a polyethylene glycol or an end-capped polyethylene glycol and is useful in the manufacture of molded or coated products which exhibit desirable thermal energy storage characteristics.

Another object of the present invention is to provide paint compositions containing polyethylene glycols or end-capped polyethylene glycols as phase change materials.

Still another object of the present invention is to provide pellets containing polyethylene glycols or end-capped polyethylene glycols which are useful in passive storage applications in which the glycols may interfere with other properties of the composition or solar active storage.

A further object of the present invention is to provide a pellet bed heat exchanger containing pellets formed from polymeric compositions containing polyethylene glycols.

BRIEF DESCRIPTION OF THE DRAWINGS

The present invention will be explained in more detail by reference to the following drawings wherein.

DETAILED DESCRIPTION OF THE INVENTION

The PEG's and end-capped PEG's used as phase change materials in the present invention have molecular weights ranging from greater than 400 to ultra high molecular weights in excess of 200,000. Included in the term "polyethylene glycol" or "PEG" are polyethylene oxides (PEO's), by which name the higher molecular weight PEG's are known in the art.

The term "end-capped" PEG's refers to PEG's in which at least one and preferably both of the terminal hydroxy groups are reacted and includes alkoxy-capped PEG's, urethane-capped PEG's, ester-capped PEG's and like compounds. In accordance with one embodiment of the invention, the glycols are end-capped by etherification with long chain, alcohols having 12 or more carbon atoms (e.g., C16-C18) and esterification with formic and acetic acids and long chain alkyl hydrocarbon acids having 12 or more carbon atoms such as stearic acid, oleic acid and the like. The etherification and esterification with long chain alcohols and acids can be used advantageously to obtain reduced water sensitivity and enhanced storage simultaneously.

The energies of the phase changes of PEG's and end-capped PEG's do not show a smooth correlation with molecular weight, but, in broad outline, as the molecular weight of the PEG increases, so do its fusion/crystallization energies until a constant value of about 40 cal/gm is reached at molecular weights of 1000 and higher. This can be seen from the results of Reference Example 1 below. PEG's having molecular weights of 1500 and 8000 are anomalous in this respect and this may be due to the molecular weight distribution in the material or other unknown factors. All of the PEG's and end-capped PEG's used in this invention have phase change energies greater than 30 cal/g.

Figure 1:
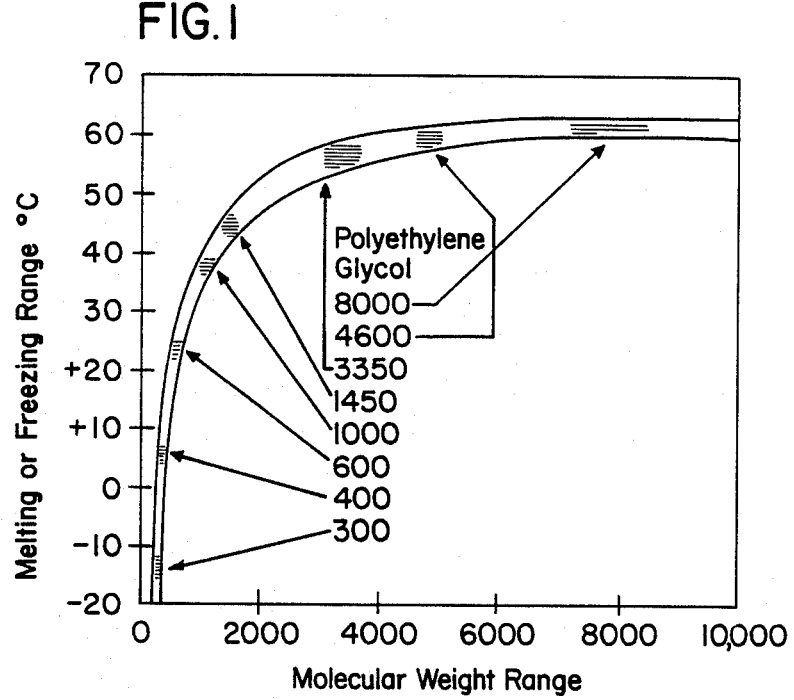
FIG. 1 is a plot of the melting point of polyethylene glycols as a function of molecular weight.

While the heats of fusion/crystallization of PEG's are fairly constant, the melting points of PEG's directly with their molecular weight. FIG. 1 is a plot of melting points and freezing points of PEG's as a function of molecular weight. Melting point varies the fastest in the molecular weight range of 300 to 1500 rising from about $-15°$ C. to $45°$ C. with that molecular weight range whereafter it increases more slowly to a limiting melting point of about $63°$ C.

By appropriately selecting PEG's, it is possible to achieve any desired melting point within a range of about $-15°$ C. (300 molecular weight) to about $63°$ C. (molecular weight greater than 8000). For climate control, heating and cooling, it is desirable to use PEG's and/or end-capped PEG's having melting points in the range of about $16°$ to $42°$ C. Consequently, for use in passive energy storage systems such as building materials, wall panels, flooring, tiles, paints and the like, the polyethylene glycols and end-capped polyethylene glycols preferably have a molecular weight in the range of about 600 to 1500.

For deicing applications, melting points of about $1°$ to $20°$ C. (preferably $5°$ to $15°$ C.) are desirable. Hence, for these applications, polyethylene glycols falling within a relatively narrow, low molecular weight range of 450 to 600 are desirable.

Figure 2:
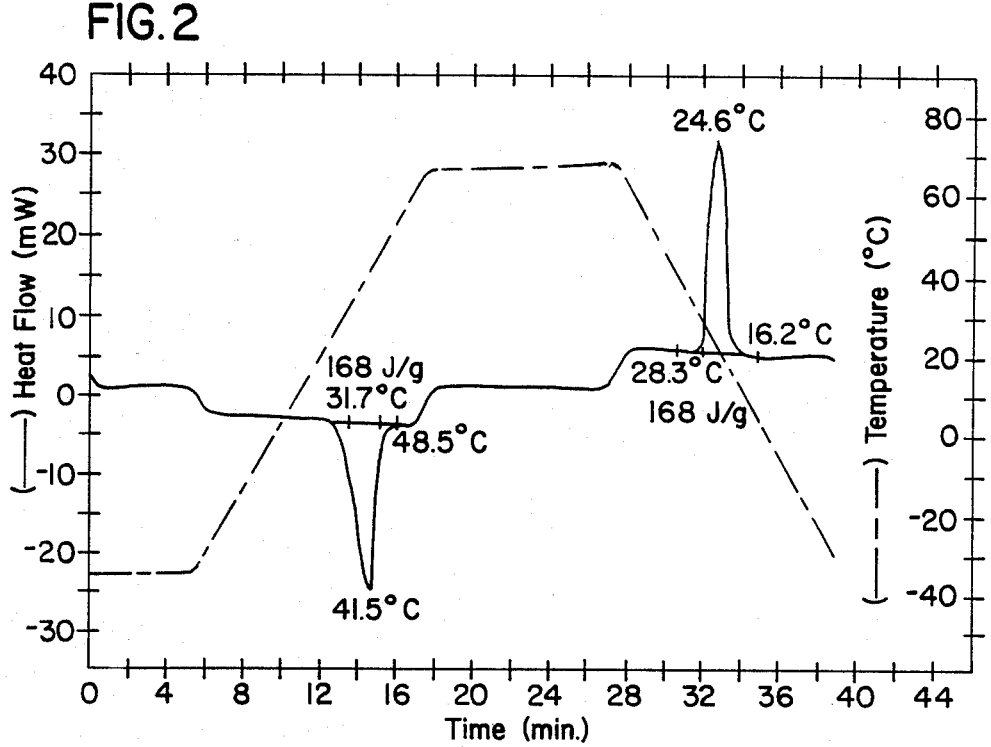
FIGS. 2-5 are differential scanning calorimetry (DSC) diagrams for selected polyethylene glycols and blends useful in the present invention.
Figure 3:
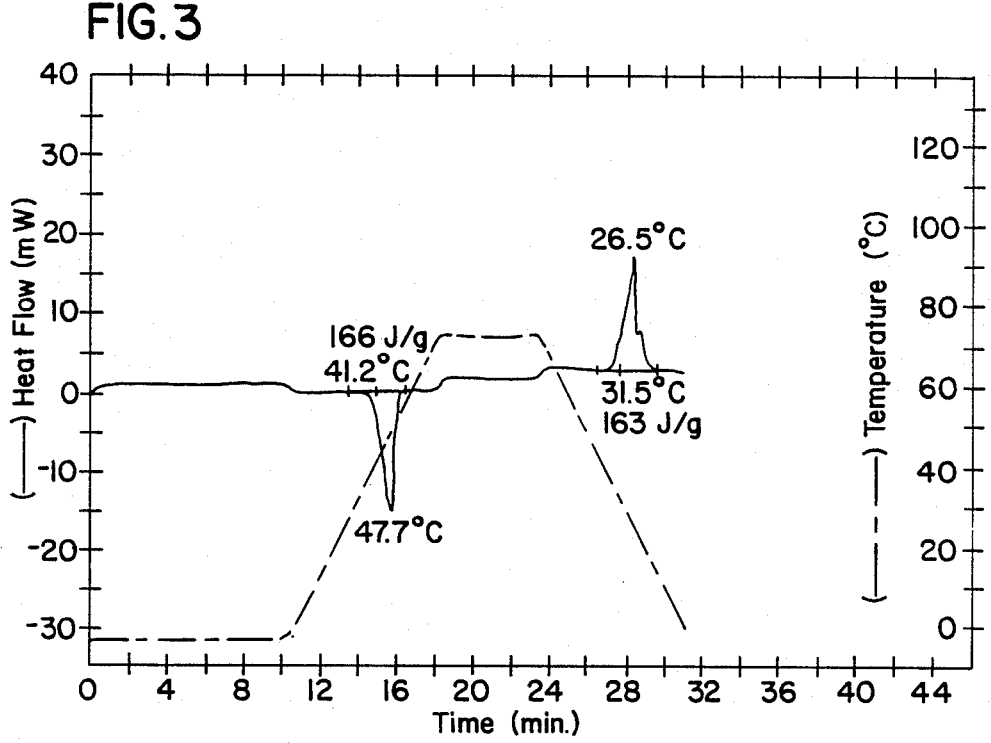
Figure 4:
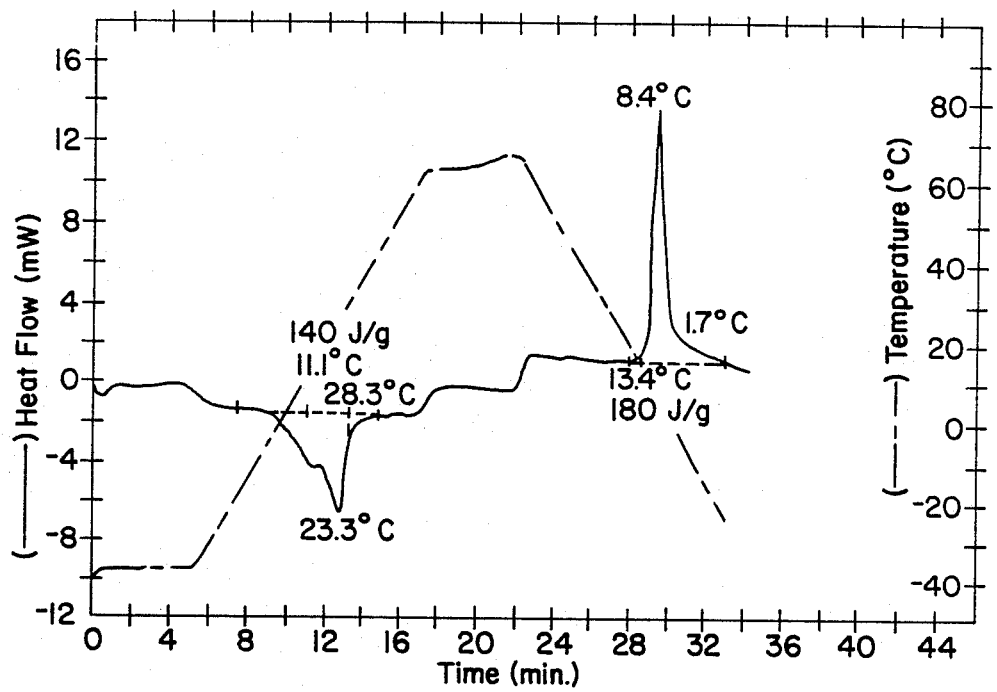
Figure 5:
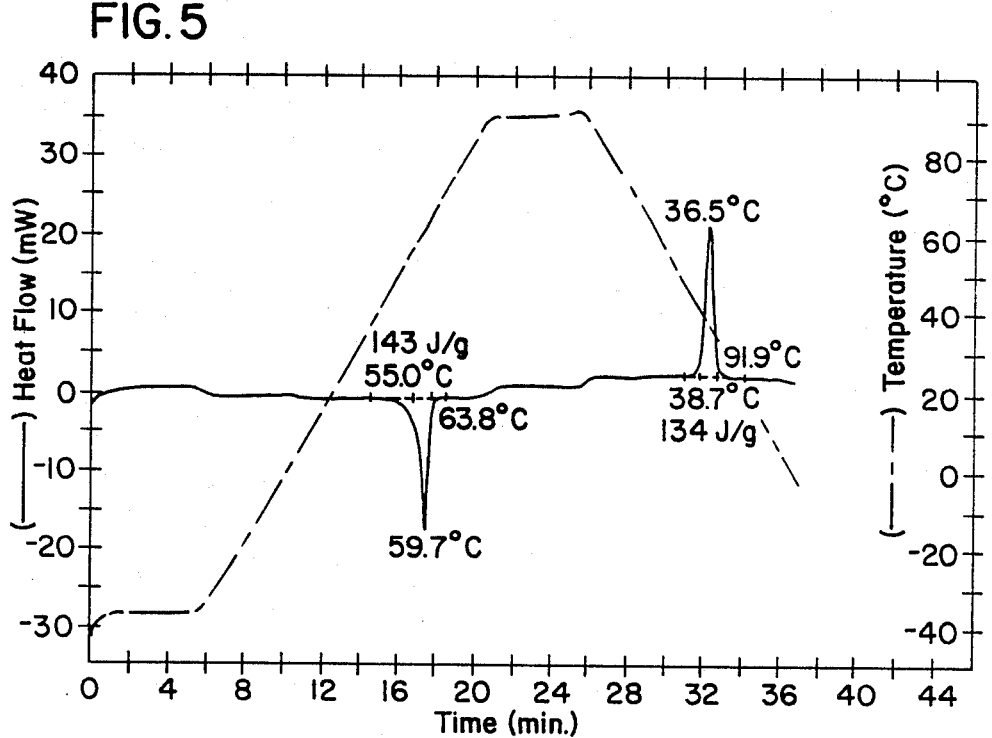

The compositions of the present invention may also be useful in certain active thermal energy storage systems, such as solar collectors and pellet bed heat exchangers. Here, melting points up to about $63°$, the maximum for PEG's, are useful and, as such, polyethylene glycols ranging from about 3500 to several million (polyethylene oxides) in molecular weight are used. To illustrate the phase change characteristics of polyethylene glycols and end-capped polyethylene glycols, differential scanning calorimeter curves are provided in FIGS. 2-5 for commercially available 1000 (FIG. 2) and 1500 (FIG. 3) molecular weight polyethylene glycols and a 750 (FIG. 4) molecular weight methoxy capped PEG (carbowax 750). FIG. 5 is a differential scanning calorimeter curve for a 100,000 molecular weight polyethylene oxide.

In most cases, the melting/freezing points of polyethylene glycols can be modified by blending polyethylene glycols or end-capped polyethylene glycols having different melting/freezing points to obtain a phase change material having an intermediate melting/freezing point. This practice can be used to tailor the thermal storage characteristics of the phase change material to meet the requirements of the particular end use.

Figure 6:
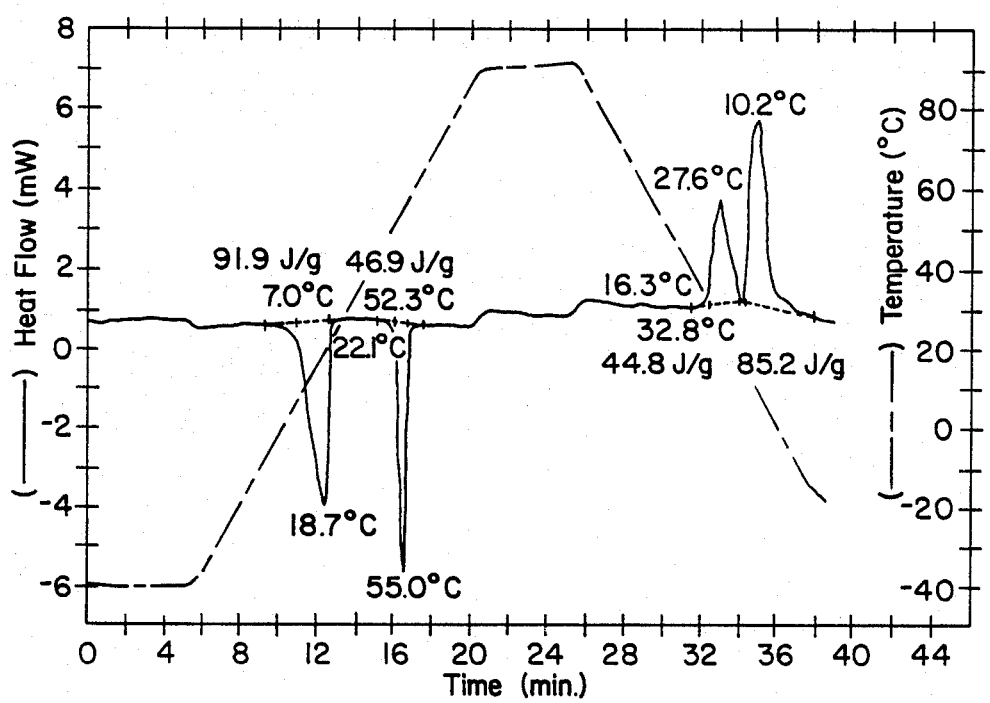
FIG. 6 is a differential scanning calorimetry curve for a blend of 600 and 8000 molecular weight PEG's.

It has been found, however, that if the molecular weights of the blended polyethylene glycols are sufficiently different, they retain their respective melting/freezing points and heats of fusion and compositions having two phase change temperatures can be prepared. This is illustrated in FIG. 6 which is the differential scanning calorimeter curve for a blend of 50 parts 600 molecular weight and 50 parts 8000 molecular weight polyethylene glycols. As the curve illustrates, in the blend, each of the glycols exhibits a separate latent heat of fusion and melting/freezing point. These materials offer the ability to design building materials which perform optimally in both heat storage and cool storage or for use in both active and passive thermal energy storage systems. The blend illustrated in FIG. 6 is particularly useful in that it could store solar heat for winter heating, and night time "cool" for summer cooling in a single composition.

As a general rule, separate heats of fusion and melting points can be maintained as long as the difference in the molecular weights of the polyethylene glycols is at least 2000, and one of the two blend components has a molecular weight of 1000 or less. The phase change materials can be blended in any ratio depending upon the performance characteristics desired. Ratios of 1/10 to 10/1 are useful.

PEG's and/or end-capped PEG's can be incorporated into thermosetting or thermoplastic, elastomeric or non-elastomeric polymeric materials. Included within the scope of the term "polymeric materials" are natural or synthetic rubbers.

The polymeric material must be compatible with the PEG or end-capped PEG such that the PEG or end-capped PEG can be incorporated into the polymeric material and remain incorporated therein upon molding or coating. If the materials are not compatible, the PEG or end-capped PEG will not disperse in the polymer or, upon molding, coating or otherwise acting on the composition, the materials will separate. The PEG or end-capped PEG can be dissolved and/or dispersed in the polymer.

PEG's can be most readily dispersed in polymers having a polar character. By "polar character" is meant that the polymer contains polar moieties therein such as carboxyl groups, hydroxyl groups and the like. Typical examples of polar polymers are nylons, polyesters, acrylate rubbers, methacrylate rubbers, polyvinyl alcohol, vinylacetate copolymers, polyvinyl acetate, vinyl chloride/vinyl acetate copolymer, neoprene, butadieneacrylonitrile rubber, etc. However, less polar or non-polar rubbers or polymers such as natural rubber, butyl rubber, polybutadiene copoly(butadiene/styrene) and copoly(ethylene/propylene) (EPDM) can also be used, although more intensive mixing is necessary. Depending on the type and molecular weight of the PEG's, it may be present as a separate phase of discrete droplets. This type of dispersion does not prevent the melting and crystallization of the phase change material.

The compositions of the present invention can be crosslinked, or uncrosslinked depending upon what physical properties (such as hardness or thermal form stability) are required in the final product. If they are crosslinked, it is essential that the compositions not be crosslinked to an extent that the phase change material loses its heat of fusion.

It is advantageous to incorporate the PEG's in rubbers having significant crystallinity that they can also function as phase change materials. Natural rubber reportedly has phase transitions at −6° and 25° C. Neoprene reportedly has a crystalline melting point at about 32° C., as is desirable for comfort heating. Other semi-crystalline rubbers include specific EPDM and copoly(ethylene/vinyl acetate) rubbers. Hence, a crystalline matrix rubber containing encapsulated PEG can provide augmented thermal energy storage capacity since both parts of the composite contribute.

End-capped PEG's such as methoxy-capped PEG's can be readily incorporated into the less polar polymers identified above. Thus, depending on the character of the polymers conventionally used in an application such as floor tiles, PEG's or end-capped PEG's can be used to impart a phase change capability to the material.

The PEG's can be incorporated into polymeric compositions in amounts of up to 50% by weight, depending on the nature of the polyethylene glycol and the polymer used. Theoretically, there is no lower limit on the amount of PEG or end-capped PEG that is used since some thermal energy storage benefit (although small) accompanies any addition. As a general rule, PEG's or end-capped PEG's are used in an amount of at least 1% by weight.

In forming molded products, the PEG or end-capped PEG can be mixed with the polymeric material in a conventional manner, e.g., in a banbury or on a roll mill. Furthermore, conventional plasticizers, fillers, pigments, curing agents, etc., can be added to the compositions to adjust their physical properties as desired It is advantageous to add fillers such as finely divided silica and carbon black to the polymer composition. They may be added in amounts ranging from about 10 to 100 parts per 100 parts of polymer.

For certain applications, it is desirable to form pellets or granules from the polymeric compositions of the present invention. This can be accomplished by incorporating PEG in the polymer, and grinding or cutting the polymer to produce pellets ranging from about 0.25 to 3.0 mm in particle size.

These pellets are particularly useful in active thermal energy storage systems or in applications in which PEG or end-capped PEG would interfere with the composition in which it is to be dispersed. In both cases, the polymers function to contain the PEG while in its liquid state. In the latter case, the polymers also isolate the PEG from the composition. The polymer may be crosslinked or not depending upon whether thermal form stability is required. For example, crosslinked pellets are used in active thermal energy storage whereas the pellets incorporated in cementitious compositions need not be crosslinked.

One example of an application in which it is particularly desirable to use PEG pellets is in forming cementitious compositions. PEG's (as contrasted with end-capped PEG's) are highly hygroscopic and tend to retard the rate with which concrete sets. Consequently, unless pelletized, they can only be added to concretes in very limited amounts typically less than about 5% by weight. PEG/polymer pellets can be dispersed in a cementitious composition in an amount up to 50% by weight.

PEG polymer pellets are particularly useful as the phase change media in pellet bed heat exchangers. In this case, as previously noted, high molecular weight PEG's and polyethylene oxides are used. Pellet bed heat exchangers are known in the art and there is no reason that the pellets of the present invention cannot be used in any exchanger design. Such exchangers generally include a heat exchanger column containing a bed of the pellets through which a heat exchange fluid (e.g., a liquid such as silicone oil or a gas such as air or nitrogen) is circulated. Typically, the pellets range in size from about 0.25 to 3.0 mm. The amount of polymer the pellets should be no more than necessary to effectively contain the glycol so as to minimize any insulative effect it may have.

PEG's and/or end-capped PEG's can also be incorporated into oil based or latex paints and coated on structures where the coating exhibits the desirable phase change properties of the PEG. PEG's are highly water soluble and readily dissolve in the aqueous base of latex paints. Upon coating these paints on walls or other surfaces, the water evaporates and a film is formed comprising a water-insoluble film-forming polymer having phase change material dispersed therein. The PEG retains its heat of fusion and melting point properties and retains its ability to function as a phase change material in the coating.

Commercially available interior latex paints containing polyvinyl acetate as the paint vehicle and exterior paints containing acrylic resin as the vehicle have been modified by simple additions of up to 20 wt. % polyethylene glycol and measurable heats of fusion and crystallization have been obtained.

PEG's are not soluble in oil based paints but, by end-capping PEG's particularly with long chain alcohols or acids (e.g., having greater than 12 carbon atoms), an oil dispersible phase change material is obtained which, upon painting and evaporation of the oil paint solvent, yields a film having minute droplets of phase change material therein.

PEG's and end-capped PEG's can be added to paint in any amount provided the PEG or end-capped PEG does not detract from the ability of the paint to form a thin uniform film. Usually the glycols are added to paints in amounts ranging from about 5 to 30% by weight and more preferably 20 to 30% by weight.

For cool storage, the melting point of the phase change material is selected to be a few (preferably 10° C.) degrees above the freezing point of water. For this reason, PEG's ranging from about 450 to about 600 in molecular weight are required.

REFERENCE EXAMPLE 1

The phase change temperatures and energies of a series of PEG's of average molecular weight ranging from 600 to 14,000 were determined using a DuPont Model 912 Dual Cell Differential Scanning Calorimeter (DSC) interfaced with a DuPont 1090 Thermal Analyzer. The cell constants for this instrument were determined using Indium and Tin standards. The energies of the fusion endotherms of the standard materials were found to be within 2.6 to 6.2% of the literature values. The fusion temperature and energy of Gallium was used to check the instrument calibration in the temperature region of interest for the PEG's. The fusion temperature of Gallium was 1.2% high (found 30.1° C., literature 29.25° C.) and the enthalpy of fusion was 1.5% low (found 18.87 cal/g, literature 19.16 cal/g) which is considered to be within experimental error. Temperature control in a cooling experiment in the DuPont DSC is not as accurate as temperature control in the heating mode of operation.

Each sample was put through four sequential heat-cool cycles at a heating/cooling rate of about 10° C./minute in a nitrogen atmosphere. Excellent precision of measurement was obtained. Experimental values are summarized in Table 1.

TABLE 1

PHASE CHANGE PROPERTIES OF POLY (ETHYLENE GLYCOLS)

| Molecular Weight | $\overline{T} + s$ (°C.) | | | $\overline{H} + s$ (cal/g) |
|---|---|---|---|---|
| | Onset (ext) | Maximum | Final | |
| Fusion | | | | |
| 600 | 5.6 ± 0.8 | 21.6 ± 2.5 | 31.4 ± 2.5 | −32.65 ± 0.50 |
| 1000 | 27.7 ± 1.5 | 42.9 ± 2.3 | 51.4 ± 1.6 | −40.85 ± 1.04 |
| 1500 | 41.4 ± 0.2 | 48.7 ± 0.9 | 55.5 ± 1.8 | −39.74 ± 0.13 |
| 3400 | 50.7 ± 0.6 | 61.8 ± 0.6 | 68.7 ± 0.9 | −46.11 ± 0.63 |
| 8000 | 49.6 ± 0.7 | 62.0 ± 0.4 | 68.3 ± 1.5 | −41.40 ± 1.23 |
| 14000 | 52.9 ± 1.1 | 63.7 ± 0.5 | 71.4 ± 2.5 | −46.90 ± 1.18 |
| Crystallization | | | | |
| 600 | 9.7 ± 0.6 | 6.1 ± 0.8 | −13.4 ± 2.1 | 31.69 ± 0.50 |
| 1000 | 32.6 ± 3.2 | 26.9 ± 3.4 | 8.6 ± 5.1 | 38.94 ± 0.48 |
| 1500 | 33.4 ± 1.7 | 28.9 ± 3.5 | 20.9 ± 8.5 | 36.71 ± 4.28 |
| 3400 | 42.5 ± 0.2 | 38.1 ± 1.0 | 30.5 ± 0.5 | 41.81 ± 0.72 |
| 8000 | 43.2 ± 2.0 | 39.3 ± 0.2 | 27.0 ± 1.4 | 38.45 ± 0.42 |
| 14000 | 45.8 ± 0.5 | 43.5 ± 0.7 | 30.2 ± 2.4 | 44.36 ± 0.36 |

It is well documented in thermal analysis literature that the temperatures at which thermal events occur are a function of the DSC heating rate. Consequently, the temperatures reported in Table 1 are to be considered as representative of the range over which both fusion and crystallization of the PEG's will occur.

REFERENCE EXAMPLE 2

One particularly advantageous feature of PEG's as phase change materials is that they generally do not exhibit a large supercooling effect. The amount of supercooling observed in the DSC experiments at heating/cooling rate of ±10° C./minute are summarized in Table 2.

TABLE 2

AMOUNT OF SUPERCOOLING IN POLY (ETHYLENE GLYCOLS)

| Molecular Weight | Onset (ext) | Maximum |
|---|---|---|
| 600 | (+4.1) | −15.5 |
| 1000 | (+4.9) | −16.0 |
| 1500 | −8.0 | −19.8 |
| 3400 | −8.2 | −23.7 |
| 8000 | −6.4 | −22.7 |
| 14000 | −7.1 | −20.2 |

Two different values are reported for each PEG. The extrapolated on-set temperature of the phase change is affected by the integration limits selected for the peak and consequently is not as accurate as the maximum temperature value. This is reflected by the parenthetical values of the extrapolated on-set temperature "supercooling" values for PEG 600 and PEG 1000. With these two exceptions, supercooling ranges from a minimum of −6.4° C. for PEG 8000 to a maximum of −23.7° C. for PEG 3400. Again, both superheating and supercooling may be a function of the heating and cooling rates, and nucleation; and, thus will be less pronounced at the much slower heating and cooling rates of the actual application. Additionally, however, we have found that small percentages (e.g., 10% weight) of higher molecular weight PEG 8000 can be used in PEG 1000 to reduce the supercooling to about ½ the value of Table 2 above.

The present invention is illustrated in more detail by the following non-limiting examples.

EXAMPLE 1

20 g polyethylene glycol (1000 molecular weight) was dispersed in 100 g polyvinyl acetate (200,000 molecular weight) in a laboratory banbury. The composition was subjected to DSC analysis according to the procedures set forth in Reference Example 1 and exhibited a melting point of 40.0° C., a crystallization point of 15.1° C. and a latent heat of fusion/crystallization of about 28 cal/g.

EXAMPLE 2

50 parts polyethylene glycol having a molecular weight of 1000 was incorporated into 100 parts butadieneacrylonitrile rubber (Chemigum HR 967, a product of Goodyear Co.) with 50 parts silica and 5 parts of peroxide curing agent (DiCup R, a product of Hercules Chemical Co.) in a laboratory banbury. Two samples were prepared, one of which was cured at 350° F. for 30 minutes and the other of which was not. Both samples were subjected to DSC analysis as in Reference Example 1. In both samples, the polyethylene glycol maintained its latent heat of fusion.

EXAMPLE 3

100 parts polyethylene glycol (molecular weight 1000) was incorporated into 100 parts Neoprene WRT (a product of E. I. duPont) with 75 parts silica and 5 parts DiCup R on a laboratory banbury. Two samples were prepared, one of which was cured at 350° F. for 30 minutes and the other of which was not. Both samples were subjected to differential scanning calorimeter analysis at 0° C./min and the polyethylene glycol retained its heat of fusion.

EXAMPLE 4

A rubber composition was prepared by compounding 100 parts EPDM (Nordel 1070) with 50 parts silica, 5 parts stearic acid, 3 parts DiCup R, 63 parts polyethylene glycol (molecular weight 1500) and 3 parts polyethylene glycol (molecular weight 8000). Two samples were prepared, one of which was cured at 350° F. for 30 minutes and the other of which was not. Upon subjecting both samples to DSC analysis, it was found that two heats of fusion were obtained corresponding to the respective polyethylene glycols.

EXAMPLE 5

Three polymeric compositions were prepared by respectively incorporating 50, 66, and 100 parts polyethylene glycol (1000 molecular weight) in 100 parts ethylene-vinyl acetate copolymer (EVA 40/55 Rubber, a product of U.S.I. Chemicals Co.). Each of the samples was analyzed DSC analysis and in each case it was found that the polyethylene glycol maintained its melting point and heat of fusion properties.

EXAMPLE 6

Figure 7:
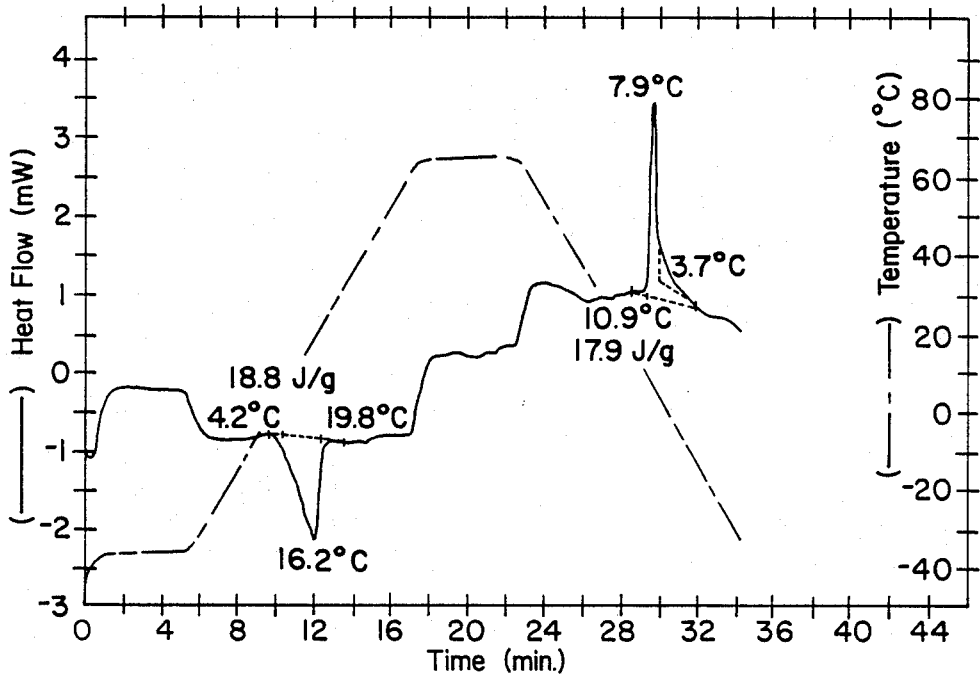
FIG. 7 is a differential scanning calorimetry curve for a latex paint containing 20 parts by weight polyethylene glycol 1000.

A polyvinyl acetate latex paint composition was modified to include a phase change material by adding 20 parts polyethylene glycol (1000 molecular weight) to 80 parts Dean & Barry White Super Velveton paint (a polyvinyl acetate latex paint). The paint composition was coated upon a support and allowed to dry. DSC analysis showed that in the dried composition, the polyethylene glycol exhibited its melting point and heat of fusion properties. The DSC curve is shown in FIG. 7. Thus, desirable thermal energy storage characteristics can be obtained through the incorporation of polyethylene glycols into latex paints.

Having described the invention in detail and by reference to preferred embodiments thereof, it will be apparent that modifications and variations are possible without departing from the scope of the appended claims.

What is claimed is:

1. A building unit having an integrated construction useful in thermal energy storage comprising a polymeric material having incorporated therein an end-capped polyethylene glycol as a phase change material, said end-capped polyethylene glycol having a molecular weight greater than about 400 and a heat of fusion greater than about 30 cal/g.

2. The building unit of claim 1 wherein said polymeric material is a polar polymer.

3. The building unit of claim 1 wherein said polymeric material is selected from the group consisting of nylons, polyesters, acrylic rubbers, methacrylic rubbers, polyvionyl alcohols, ethylene vinylacetate copolymer, polyvinyl acetate, vinylchloride/vinyl acetate copolymer, neoprene, butadiene/acrylonitrile copolymer, natural rubber, EPDM, polybutadiene rubber, and butadiene styrene copolymer.

4. The building unit of claim 1 wherein said polymeric material is a crystalline polymer having a melting point in the range of 16° to 42° C.

5. The building unit of claim 1 wherein end-capped polyethylene glycol has a molecular weight in the range of about 600 to 1500.

6. The building unit of claim 3 wherein said end-capped polyethylene glycol is present in an amount up to about 30% by weight.

7. The building unit of claim 1 wherein said end-capped polyethylene glycol is present in an amount up to about 20% by weight.

8. The building unit of claim 1 wherein said phase change material is a blend of end-capped polyethylene glycols having distinct melting points such that said blend exhibits two distinct melting points and two distinct heats of fusion.

9. The building unit of claim 8 wherein said blend comprises an end-capped polyethylene glycol having a first molecular weight and an end-capped polyethylene glycol having a second molecular weight and the difference between said first molecular weight and said second molecular weight is at least 2000.

10. The building unit of claim 1 wherein said end-capped polyethylene glycol is dispersed and/or dissolved in said polymeric material.

11. The building unit of claim 1 wherein said polymeric material is a natural or synthetic rubber.

12. The building unit of claim 1 wherein said building unit is crosslinked.

13. The building unit of claim 1 wherein said building unit is a floor title.

14. The building unit of claim 1 wherein said building unit is a wall panel.

15. A thermal energy storage panel having an integrated construction useful in thermal energy storage comprising a polymeric material having incorporated therein an end-capped polyethylene glycol as a phase change material, said end-capped polyethylene glycol having a molecular weight greater than about 400 and a heat of fusion greater than about 30 cal/g.

* * * * *

UNITED STATES PATENT AND TRADEMARK OFFICE
CERTIFICATE OF CORRECTION

PATENT NO. : 4,825,939
DATED : May 2, 1989
INVENTOR(S) : Ival O. Salyer et al

It is certified that error appears in the above-identified patent and that said Letters Patent is hereby corrected as shown below:

Column 10, Claim 3, line 8, "polyvionyl" should be --polyvinyl--.

Signed and Sealed this

Twenty-third Day of January, 1990

Attest:

JEFFREY M. SAMUELS

Attesting Officer     Acting Commissioner of Patents and Trademarks